United States Patent [19]

Oldendorf et al.

[11] Patent Number: 4,848,477

[45] Date of Patent: Jul. 18, 1989

[54] ELECTRONIC BALANCE WITH ELECTRONIC CORNER-LOAD CORRECTION

[75] Inventors: Christian Oldendorf, Göttingen; Franz-Josef Melcher, West-Göttingen; Christoph Berg, Adelebsen, all of Fed. Rep. of Germany

[73] Assignee: Sartorius GmbH, Fed. Rep. of Germany

[21] Appl. No.: 259,724

[22] Filed: Oct. 19, 1988

[30] Foreign Application Priority Data

Nov. 21, 1987 [DE] Fed. Rep. of Germany ....... 3739550

[51] Int. Cl.⁴ ...................... G01G 23/01; G01G 21/24
[52] U.S. Cl. .................................. 177/25.14; 177/50; 177/255
[58] Field of Search ...................... 177/25.14, 50, 255

[56] References Cited

U.S. PATENT DOCUMENTS

| | | | |
|---|---|---|---|
| 4,380,175 | 4/1983 | Griffen | 177/211 |
| 4,401,173 | 8/1983 | Komoto | 177/255 X |
| 4,482,022 | 11/1984 | Komoto | 177/255 X |
| 4,799,558 | 1/1989 | Griffen | 177/255 X |

*Primary Examiner*—George H. Miller, Jr.
*Attorney, Agent, or Firm*—Eric P. Schellin

[57] ABSTRACT

The invention suggests for an electronic balance with a balance scale (1), with a parallel guide for the balance scale (1), with at least one sensor which measures the torques transferred from the balance scale (1) to the parallel guide, with storage means in the electronic circuitry of the balance in which means the magnitude of the corner-load inaccuracies of the parallel guide is stored in the form of corner-load correction factors and with switching means or program parts in the electronic circuitry of the balance which correct the weight value outputted from the measuring system on the basis of the output signals of the sensor or sensors and of the stored corner-load correction factors that controllable signals (10–13) are provided which designate the corners and sides of the balance scale (1). The signals can be formed by light sources adjacent to the balance scale (1) or in the corners or on the sides of the display field (9). The use of individual segments of the 7-segment numbers (3) of the balance display is preferred. An operator control can be achieved with these signals when readjusting the corner-load freedom of the balance.

14 Claims, 3 Drawing Sheets

ELECTRONIC BALANCE WITH ELECTRONIC CORNER-LOAD CORRECTION

The invention relates to an electronic balance with a balance scale having a parallel guide for the balance scale, with at least one sensor which measures the torques transferred from the balance scale to the parallel guide, with storage means in the electronic circuitry of the balance in which means the magnitude of the corner-load inaccuracies of the parallel guide is stored in the form of corner-load correction factors and with switching means or program parts in the electronic circuitry of the balance which correct the weight value outputted from the measuring system on the basis of the output signals of the sensor or sensors and of the stored corner-load correction factors.

A balance of this type is known from DE-PS No. 30 03 862. The electronic corner-load correction permits a simple and economical adjustment of the corner-load play of the balance during manufacture without mechanical adjusting elements having to be actuated. However, no thought is given to the readjustment of the corner load play during the service life of the balance in the conventional balances of the state of the art.

The invention therefore has the object of disclosing a balance of the type initially cited in such a manner that a readjustment of the corner-load behavior is readily possible by the user of the balance and that auxiliary means for an operator control of this adjustment procedure are made available.

The invention solves this object in that controllable signals are present for readjusting the corner-load behavior which designate the corners or sides of the balance scale for determining the position of a test weight.

These signals can be used for an operator control when readjusting the corner-load behavior of the balance; they signal to the operator in which range of the balance scale the test weight should be placed. The operator can confirm that the test weight is at the proper place by activating one of the operating keys, e.g. the tare key, which are present in any case. The electronic circuitry of the balance can then calculate and store new correction factors for the electronic corner-load correction from the weight values measured by the measuring system at the various positions of the test weight.

The said signals are formed in an advantageous embodiment by light sources which can be located e.g. adjacent to the balance scale or in the corners or on the sides of the display field.

In another advantageous embodiment, the signals are formed by parts of the 7-segment numbers of the balance display. In this instance the upper crossbeam of the 7-segment numbers is controlled with advantage as a signal for the back edge of the balance scale; the lower crossbeam as signal for the front edge; the two right longitudinal beams of the 7-segment number furthest to the right as signal for the right edge; and the two left longitudinal beams of the 7-segment number furthest to the left as signal for the left edge. At least the upper crossbeam and the upper right longitudinal beam of the 7-segment number furthest to the right are advantageously controlled as signal for the back right corner; the signals for the three other corners then result in a logical manner.

BRIEF DESCRIPTION OF THE DRAWINGS INVENTION

The invention is described in the following with reference made to the schematic figures.

DETAILED DESCRIPTION OF THE INVENTION

Figure 1:
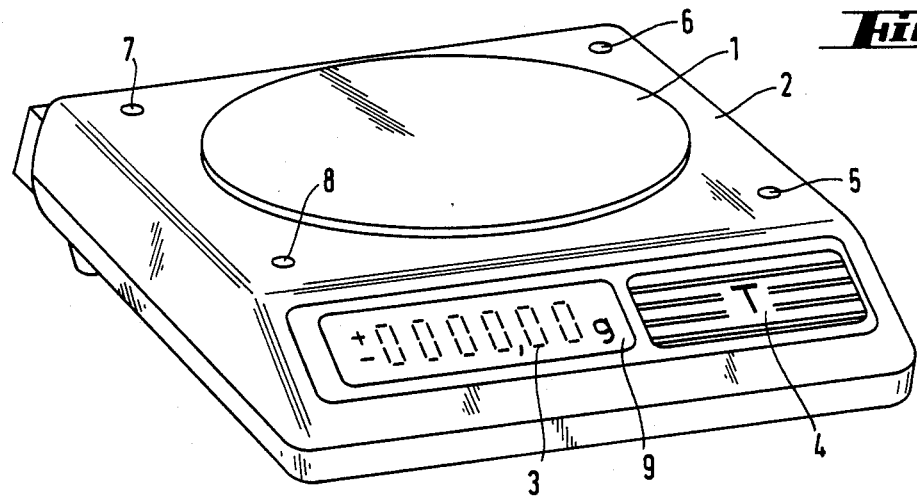
FIG. 1 shows the electronic balance in a first embodiment.

The electronic balance in FIG. 1 consists of a housing 2, balance scale 1, display 3 for the result of weighing and tare key 4. The inner design and mode of operation of this balance is described e.g. in the above-mentioned DE-PS No. 30 03 862, and is incorporated herein by reference in its entirety, so that more detailed explanations are not necessary here. Four signals in the form of light sources 5, 6, 7, 8 are present for operator control when adjusting the corner load. These light sources can be light-emitting diodes, for example. If he corner load of the balance is to be readjusted, which is communicated to the balance in a known manner e.g. by means of the selection of a certain menu position, then one of the light sources is actuated, e.g. light source 5, and the operator places any desired test weight on the right front "corner" of balance scale 1 in the vicinity of light source 5. (The concept "corner" is also used for the round balance scale shown in order to designate the edge area of the scale which is reached from the center along one of the diagonals of the balance housing. In a corresponding manner, the concept "edge" or "side", thus, for example "front edge", is also used in a logical fashion for round balance scales.) The operator acknowledges the correct position of the test weight by subsequently pressing tare key 4. Subsequently, light source 6 lights up (light source 5 goes out when tare key 4 is pressed), the operator places the test weight in the back right corner, corresponding to light source 6, presses tare key 4 again and so forth. All four light sources 5–8 can light up simultaneously at the end or also at the beginning in order to symbolize that the test weight is to be placed in the center of the balance scale. The electronic circuitry of the balance calculates and stores new corner-load correction factors for the parallel guide in a known manner from the individual weight values which the measuring system of the balance has determined at the particular portions of the test weight. It is not critical if an exact position of the test weight is not maintained on the balance scale by the operator since the built-in sensor or sensors measure the torques transferred from the balance scale to the parallel guide and can determine therewith the exact position of the test weight.

Any expert in the art can readily design the operator control to be quite comfortable. For example, the measured results from the four corners and the center of the balance scale can be checked for play discrepancies and if the discrepancies are too great, the operator can be requested to repeat one or more measurements. Or, the operator control is limited to allowing all light sources 5-8 to light up since the position of the test weight selected by the user can be derived from the signals of the corner-load sensors, and a repetition of a measurement in a corner is only requested in the case of discrepancies between the individual measured values by the illumination of only this one light source, The weight display of the balance can also be included in the operator control by displaying the weight of the test piece in a blinking fashion if e.g. the test weight is too small, e.g. 50% of the weighing range.

Figure 2:
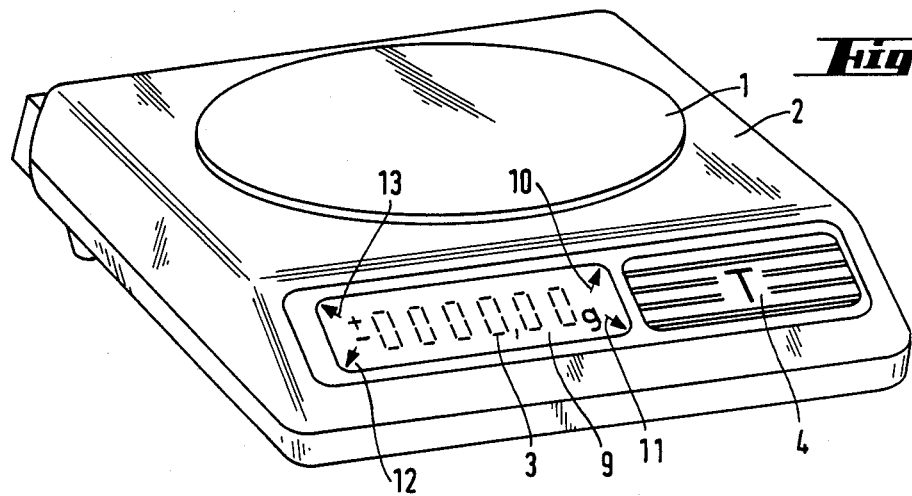
FIG. 2 shows the electronic balance in a second embodiment.

FIG. 2 shows another embodiment of the electronic balance. Here, the signals have the form of arrows 10-13 in the corners of display field 9. Arrow 11 at the right bottom designates the right front corner of the balance scale, arrow 10 at the right top of the right back corner, and so forth. The arrows can be illuminated from below e.g. by appropriate light sources. They can also be designed as normal display segments, e.g. in the case of liquid-crystal displays, and when the numbers are displayed are dark on a bright background, they can also be designed as dark arrows on a bright background. Naturally, all four arrows are normally not actuated as is shown in FIG. 2, but rather only one at a time. Overlooking of the arrows can be avoided e.g. by having them blinking. The course of a corner-load readjustment is the same as in the embodiment according to FIG. 1.

Figure 3:
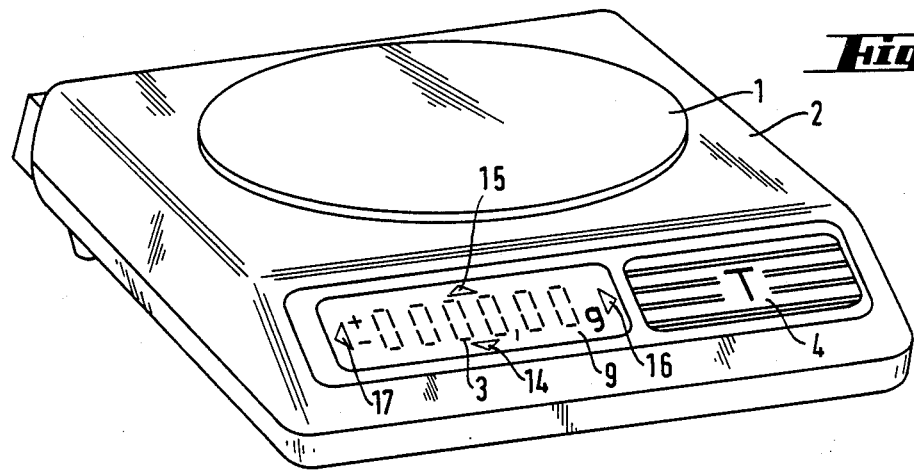
FIG. 3 shows the electronic balance in a third embodiment.
Figure 4:
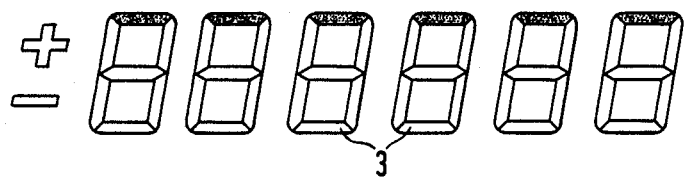
FIGS. 4 to 15 show the display of the electronic balance in a fourth embodiment with the elements for the various positions on the balance scale.
Figure 5:
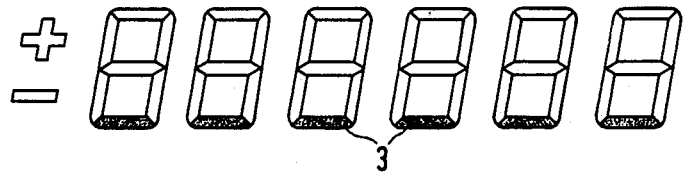
Figure 6:
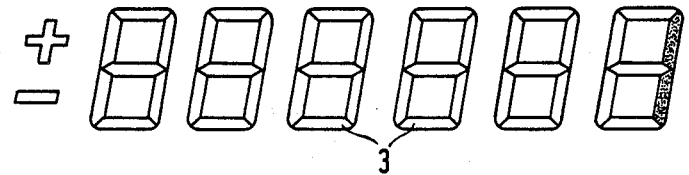
Figure 7:
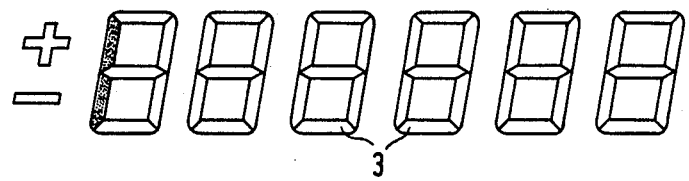
Figure 8:
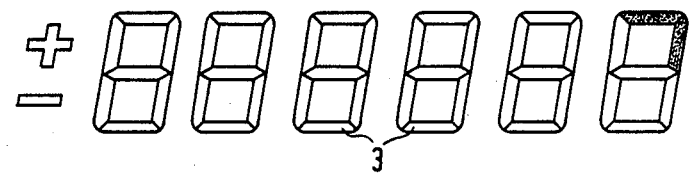
Figure 9:
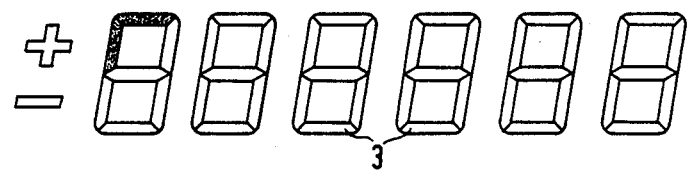
Figure 10:
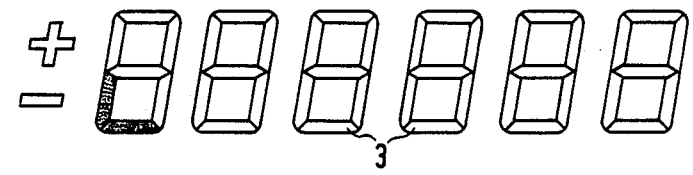
Figure 11:
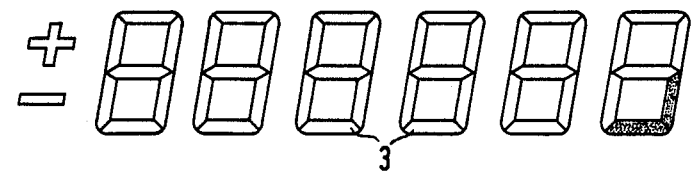

FIG. 3 shows a third embodiment of the electronic balance. Once again, the controllable signals are located in display field 9: Triangle 14 symbolizes the front edge of the balance scale 1, triangle 16 the right side edge, triangle 17 the left side edge and triangle 15 the back edge. The operation is again exactly as described for FIGS. 1, 2 with the difference that here the test weight is to be placed onto the balance scale in the vicinity of the front/back/side edges. Naturally, arrows, lines or similar forms can also be used instead of the triangles.

The fourth embodiment, which is shown in FIGS. 4 to 15, utilizes the 7-segment numbers of the balance display in order to designate the various positions on the balance scale. All segments of all numbers are shown in the figures in outline in order to clearly show the position of the filled-in segments which are actually controlled. The upper crossbeams in FIG. 4 symbolize the back edge of the balance scale, the lower crossbeams in FIG. 5 symbolize the front edge of the balance scale, the two right longitudinal beams of the 7-segment number furthest to the right in FIG. 6 symbolize the right edge of the balance scale and the two left longitudinal beams of the 7-segment number furthest to the left in FIG. 7 symbolize the left edge The upper crossbeam and the upper right longitudinal beam of the 7-segment number furthest to the right in FIG. 8 symbolize the back right corner of the balance scale, the two segments in FIG. 9 the back left corner, the two segments in FIG. 10 the front left corner and the two segments in FIG. 11 the front right corner.

Figure 12:
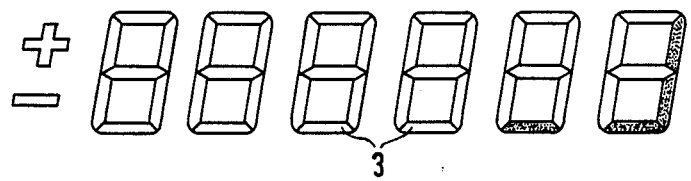
Figure 13:
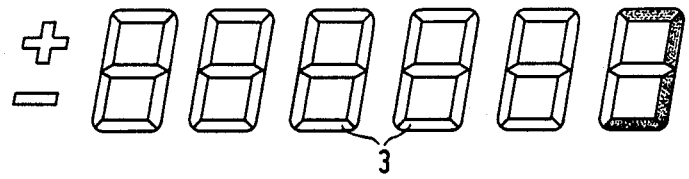

This embodiment is particularly flexible, since other signals can also be easily generated by simply changing the software in the display driver. FIG. 12 shows, using the front right corner as example, that this corner can also be symbolized by four segments; or, the side edges can likewise be symbolized by four segments, as is shown in FIG. 13, using the right side edge as example; or, the front/back edges can be symbolized only by the crossbeams of the two middle or the four middle 7-segment numbers instead of by all crossbeams as in FIGS. 4, 5.

Figure 14:
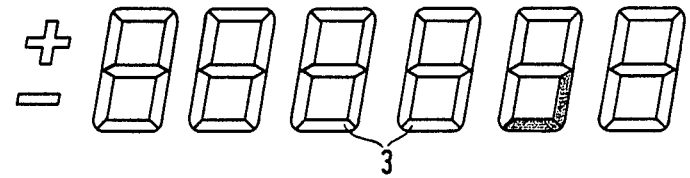
Figure 15:
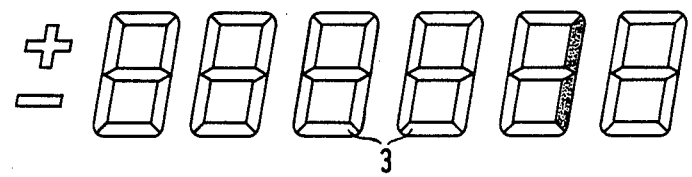

In the same manner, this latter embodiment can be easily adapted to those instances in which the corner-load adjustment must take place at at least two different distances of the test weight from the center of the balance scale on account of a non-linear behavior of the parallel guide in the case of off-center loading. FIG. 14 shows as example the signal for the position half-way to the right front and FIG. 15 shows as example the symbol for the position half-way to the right.

Figure 16:
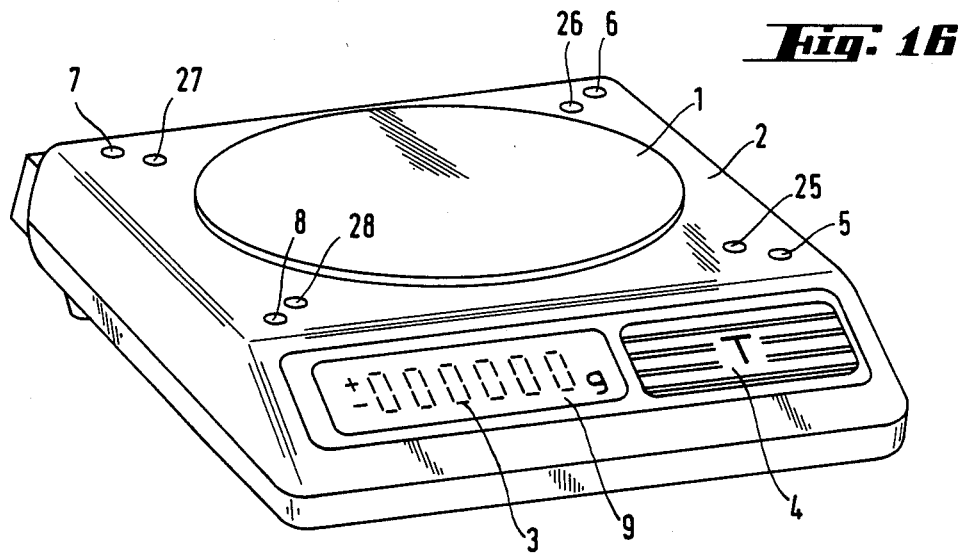
FIG. 16 shows the electronic balance in a fifth embodiment.

However, it is also possible to symbolize two different distances from the center of the balance scale with an embodiment similar to the one shown in FIG. 1. To this end, the balance shown in FIG. 16 comprises a total of eight light sources 5-8 and 25-28. Light sources 5-8 symbolize in the manner already described the position entirely on the outer edge of the balance scale whereas light sources 25-28 symbolize the corresponding positions in the middle between the center and the edge of the balance scale.

What is claimed is:

1. Electronic balance with a balance scale, with a parallel guide for the balance scale, with at least one sensor which measures the torques transferred from the balance scale to the parallel guide, with storage means in the electronic circuitry of the balance in which means the magnitude of the corner-load inaccuracies of the parallel guide is stored in the form of corner-load correction factors and with switching means or program parts in the electronic circuitry of the balance which correct the weight value outputted from the measuring system on the basis of the output signals of the sensor or sensors and of the stored corner-load correction factors, characterized in that controllable signals (3, 5 . . . 8, 10 . . . 13, 14 . . . 17, 25 . . . 28) are present for readjusting the corner-load behavior of the balance which designate the corners or sides of the balance scale (1) for determining the position of a test weight.

2. Electronic balance according to claim 1, characterized in that the signals are formed by light sources (5-8, 25-28).

3. Electronic balance according to claim 1, characterized in that the signals are located adjacent to the balance scale (1).

4. Electronic balance according to claim 1, characterized in that the signals (10-13) are located in the corners of the display field (9).

5. Electronic balance according to claim 1, characterized in that the signals (14-17) are located at the sides of the display field (9).

6. Electronic balance according to claim 1 characterized in that the signals are formed by parts of the 7-segment numbers (3).

7. Electronic balance according to claim 6, characterized in that the upper crossbeams of the 7-segment numbers (3) are controlled as signal for the back edge of the balance scale (1).

8. Electronic balance according to claim 6, characterized in that the lower crossbeams of the 7-segment numbers (3) are controlled as signal for the front edge of the balance scale (1).

9. Electronic balance according to claim 6, characterized in that the two right longitudinal beams of the 7-segment number (3) located furthest to the right are controlled as signal for the right edge of the balance scale (1).

10. Electronic balance according to claim 6, characterized in that the two left longitudinal beams of the 7-segment number (3) located furthest to the left are controlled as signal for the left edge of the balance scale (1).

11. Electronic balance according to claim 6, characterized in that at least the upper crossbeam and the upper right longitudinal beam of the 7-segment number (3) located furthest to the right are controlled as signal for the right back corner of the balance scale (1).

12. Electronic balance according to claim 6, characterized in that at least the upper crossbeam and the upper left longitudinal beam of the 7-segment number (3) located furthest to the left are controlled as signal for the left back corner of the balance scale (1).

13. Electronic balance according to claim 6, characterized in that at least the lower crossbeam and the lower left longitudinal beam of the 7-segment number (3) located furthest to the left are controlled as signal for the left front corner of the balance scale (1).

14. Electronic balance according to claim 6, characterized in that at least the lower crossbeam and the lower right longitudinal beam of the 7-segment number (3) located furthest to the right are controlled as signal for the right front corner of the balance scale (1).

* * * * *